April 10, 1951 W. E. KNAPP 2,548,539
GANG CONNECTION FOR DISK HARROWS
Filed July 21, 1945
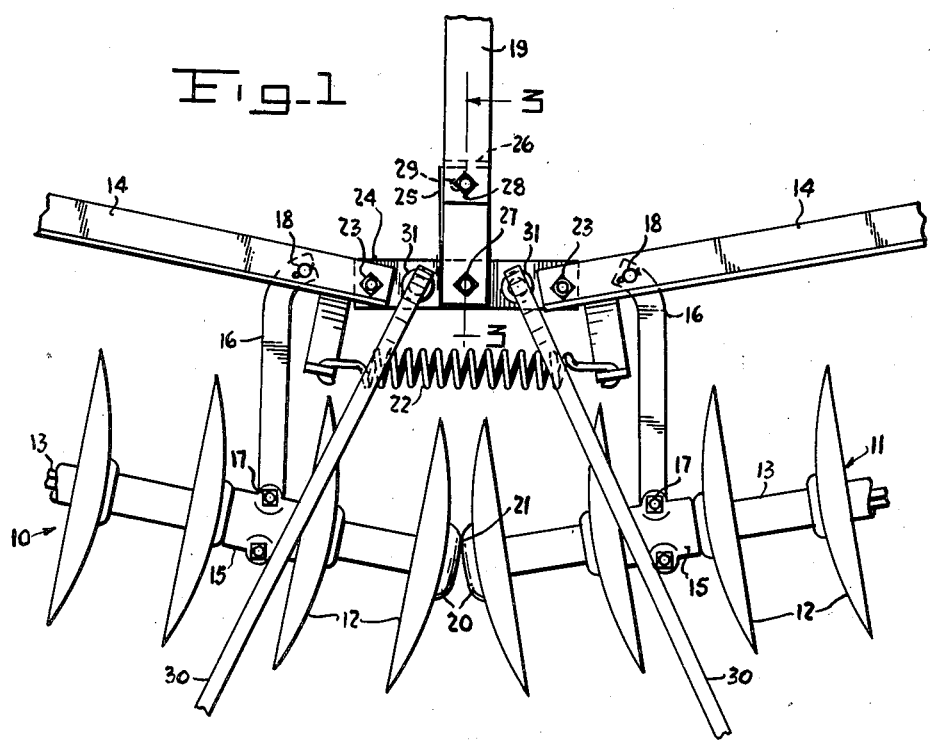
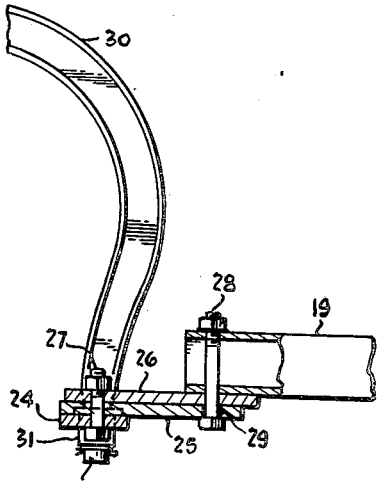
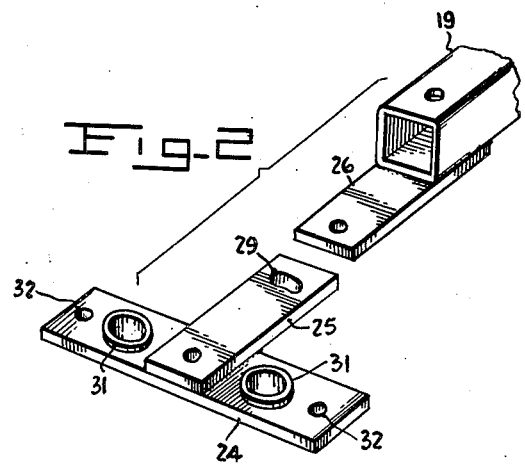
Inventor
WILLIAM E. KNAPP
By Carlsen + Hagle
Attorneys Patented Apr. 10, 1951

2,548,539

UNITED STATES PATENT OFFICE 2,548,539

GANG CONNECTION FOR DISK HARROWS

William E. Knapp, Moline, Ill., assignor, by mesne assignments, to Minneapolis-Moline Company, Hopkins, Minn., a corporation of Minnesota Application July 21, 1945, Serial No. 606,333

10 Claims. (Cl. 55—81)

This invention relates generally to improvements in disk harrows and more particularly to means for connecting the individual gangs of such implements to the draft tongue.

In both single and double cut, or tandem, disk harrows the outwardly and forwardly angling disk gangs are subject to considerable inward, endwise thrust due to reaction of the earth against the disks. This inward thrust, tending to jam inner ends of the gangs together, is borne by bumpers at the inner ends of the gangs, which bumpers roll in contact with each other. The actual contact between the bumpers is eccentric to the axes of the gangs, forwardly thereof, by a distance dependent in each harrow on the angle of the gangs. If there is even a slight difference in this contact point eccentricity for the respective bumpers, that is, if the contacting point on each bumper is not the same distance from the gang axis as the other, then one bumper will have a decided tendency to ride up or climb the other as the disks rotate. This results in one gang rising at its inner end and causes very uneven penetration of the disks at inner ends of the gangs. Heretofore, to my knowledge, disk harrows have had no provision for relatively adjusting inner ends of the gangs to bring the contacting points on the bumpers to equal distance from the disk centers and so maintain them against the effects of wear. Reliance has instead been placed solely on accurate and perfect manufacturing operations in the initial fabrication of the parts, but even so, unequal field wear has quickly rendered such initial perfection useless and caused the trouble mentioned to soon appear.

In accordance with my present invention, and as the primary object thereof, I provide an adjustable gang connection by which inner ends of the disk gangs may be readily and relatively adjusted in fore and aft directions as may be required to maintain the bumpers in perfect contact. Another object is to provide a connection of this kind which is very simple, adds but little to the initial cost of the implement, and which further includes an advantageous gang connection and rear gang steering connections where the device is used in connection with a double cut or tandem harrow.

These and other more detailed and specific objects will be disclosed in the course of the following specification, reference being had to the accompanying drawings, in which—

Fig. 1 is a fragmentary plan view of the center portion of a disk harrow showing the bumpers in contact and the connection forming my invention in place on the harrow.

Fig. 2 is an enlarged perspective view of my improved connecting device and associated parts, separated from each other.

Fig. 3 is an enlarged fragmentary vertical and longitudinal sectional detail view taken substantially along the line 3—3 in Fig. 1.

Referring now more particularly and by reference characters to the drawing I have shown therein the central portion of a conventional disk harrow having oppositely, laterally extending and outwardly and forwardly angling disk gangs 10 and 11. These gangs may be the two gangs of a single cut harrow such as, for example, that shown in the John P. Seaholm Patent No. 2,266,819, issued December 23, 1941, or the gangs may be the forward gangs of a double cut or tandem harrow of the type shown in the John P. Seaholm Patent No. 2,320,015, issued May 25, 1943. As here shown, the gangs are a part of the latter type of harrow but I do not, of course, limit myself to the application of my present invention to either of the harrows covered by these prior patents.

In accordance with the present day usual practice each harrow gang 10 and 11 comprises a number of disks 12 supported for rotation with an axle assembly 13 which is journaled behind a draft or side bar 14. As here seen, only the inner bearings for thus supporting and transmitting draft to the gangs are shown, same being indicated at 15, and these bearings are connected by drag links 16 to the bars 14. The drag links 16 are pivoted at 17 to the bearings 15 and at 18 to the bars 14, and as a result of this arrangement the gangs 10 and 11 may move endwise toward and away from each other and the center of the harrow. The inner ends of the draft bars 14 are connected, as will presently appear, to the rear of a draft tongue 19 and as the harrow is pulled forwardly by the tongue, with the gangs at the working angles here shown it will be understood that the reaction of the earth or soil being cut by the disks 12 will tend to urge both gangs in an inward direction with a very considerable force.

The foregoing action of the gangs, as they work, is limited by the contact of conventional bumpers 20 provided at their inner ends. As seen in Fig. 1 these bumpers roll in contact with each other and the actual point of contact, indicated at 21, is spaced forwardly from the disk centers, or axes of rotation, by a distance determined in each case by the angles of the gangs, So long as the bumpers 20 contact each other at the same distances from their respective centers there results no appreciable upward component of force from this rotation of the gangs in contact. Immediately, however, as either gang gets out of proper line, and the bumpers do not contact each other at exactly the same distance from center, then there is a pronounced tendency for one bumper to climb on the other, resulting in very uneven penetration of the disks at the center of the harrow.

Inasmuch as the normal reaction on the gangs causes them to rise at inner ends, making necessary the provision of a hold down spring 22 to counteract this tendency, as clearly set out in the patents previously indentified, the climbing tendency of one gang due to uneven bumper contact aggravates the situation, making it impossible to evenly hold down the inner ends of the gangs.

The side or draft bars 14 are pivotally connected by pins or bolts 23 at their inner ends to a connecting or tie member 24 which is attached to and extends crosswise with respect to the tongue 19. These pivotal connections enable the gangs to be angled to various transport or working positions, of course. Ordinarily the member 24 is rigid with respect to the tongue 19 and thus only the accuracy with which the various parts are fabricated and assembled will determine the evenness of the contact between the bumpers 20. Obviously in machinery of this kind manufacturing precision in its common conception is difficult, if not impossible, while the results of field wear soon overcome such accuracy as initially present. In the end, then, the bumper contact becomes even and the undesirable, uneven penetration sets in.

In accordance with my invention I make the connecting member 24 swingable and adjustable with respect to the tongue 19 so that the pivots 23, which act as pivots for the gangs as a whole, may be moved horizontally and relatively forwardly and rearwardly. To this end, the connecting member is rigidly secured, as by welding or other suitable means, to a center piece or bar 25 which is positioned below the rear end of the tongue 19 and attached thereto. A wear strip 26 is rigidly secured or welded beneath the tongue and extends rearwardly therefrom to form a bearing against which the bar 25 is upwardly positioned, and a pivot pin or bolt 27 connects these parts near their rear ends. Forwardly of the pivot 27 a locking bolt 28 connects the tongue and bar 25, extending vertically therethrough, and where the bolt 28 penetrates the bar 25 the latter is provided with an arcuate, laterally or transversely elongated slot 29.

The foregoing arrangement is such that by loosening the bolts the bar 25, and connecting member 24 carried thereby, may be oscillated through a limited range about the bolt 27 as a pivot, and then locked in any adjusted position by again drawing the bolts tight. Such movements cause the respective pivots 23 for the gangs to be oppositely adjusted, in forward and rearward directions, and it is thus evident that the inner ends of the gangs may be correspondingly adjusted at any time and as may be required to maintain the bumpers 20 in proper contact.

Ordinarily, in a tandem or double cut harrow in which steering and connecting bars 30 extend back over the gangs 10—11 to the rear gangs (not here shown but see previously identified Patent No. 2,320,015) the forward, lower ends of these bars are passed through the connecting member 24 and inner ends of the draft bars 14 to form the pivots for the gangs 10 and 11, in lieu of the bolts 23 here shown. It is found, however, that due to the quite severe and continuous angling movements of the bars 30 as the harrow operates, as compared to movements of the bars 14 about pivots 23, the wear is considerable at these forward pivots so that the first gangs soon have considerable play.

I overcome this objectionable feature by the provision of bearings 31 separate from and located inwardly of the front gang pivots 23, and the openings 32 in the bar 24 therefor, and in these bearings 31 the forward, downwardly turned ends 33 of the bars 30 are pivotally seated as clearly seen in Fig. 3. By thus separating the pivots for the front gangs 10 and 11 and bars 30 the wear due to the bars swinging about their pivots has no effect on front gang alignment. Furthermore I provide as the bearings 31 elongated replaceable sleeves as clearly shown, seated through the member 24, to better take the wear.

Attention is further called to the fact that the separate pivots for the draft bars 14 and overhead bars 30 permits the latter to be removed from the implement at any time without affecting the operation of the front gangs 10 and 11 which, of course, remain connected at all times. Thus a tandem or double-cut harrow such as shown in Patent No. 2,320,015 becomes a dual purpose implement, since by merely detaching the forward ends of the bars connecting the rear gangs to the forward gangs, the forward gangs may be used alone as a single cut harrow.

Obviously this improved connection may be readily and inexpensively applied to the harrow and will not in any way interfere with all normal operations thereof.

It is understood that suitable modifications may be made in the structure as disclosed, provided such modifications come within the spirit and scope of the appended claims. Having now therefore fully illustrated and described my invention, what I claim to be new and desire to protect by Letters Patent is:

1. In a disk harrow, oppositely extending disk gangs, oppositely extending draft bars connected to the gangs, a draft device, a connecting member connecting the inner ends of the draft bars to the draft device, and the said connecting member being swingably mounted upon the draft device for forward and rearward swinging movements to correspondingly adjust the inner ends of the draft bars and disk gangs.

2. In a disk harrow, oppositely extending disk gangs, oppositely extending draft bars connected to the gangs, a draft member, a connecting member having oppositely extending ends pivotally connected to the inner ends of the draft bars, and said connecting member being swingably and adjustably connected to the draft member for forward and rearward swinging movements whereby the ends of the connecting member may be oppositely adjusted in forward and rearward directions to correspondingly adjust inner ends of the gangs.

3. In a disk harrow, oppositely extending disk gangs, oppositely extending draft bars connected to the gangs, a draft member, a connecting member having oppositely extending ends pivotally connected to the inner ends of the draft bars, and said connecting member having a center part pivotally and adjustably connected to the draft member whereby the ends of the connecting member may be oppositely adjusted forwardly and rearwardly to align inner ends of the gangs.

4. In a disk harrow, oppositely extending disk gangs, oppositely extending draft bars connected to the gangs, a draft member, a connecting member having oppositely extending ends pivotally connected to the inner ends of the draft bars, and said connecting member having a center part extending in a fore and aft plane and pivotally connected at its rear end portion to the draft member, a bolt located in the draft member forwardly of the pivot, and an arcuate slot in the forward portion of said center part receiving said bolt whereby the connecting member may be oscillated to move its ends oppositely forwardly and rearwardly to correspondingly adjust the inner ends of the gangs.

5. The combination in a disk harrow having a pair of oppositely extending disk gangs and having bumpers at their inner ends operative to roll in contact with each other, and a draft device, of a member connecting the inner ends of the gangs to the draft device, and said member being swingable in forward and rearward directions with respect to the draft device to differentially adjust the bumpers in forward and rearward directions.

6. In a disk harrow, a pair of oppositely extending disk gangs, the said gangs having bumpers at inner ends which roll in contact with each other at points eccentric to the axes of the gangs, means for adjusting and maintaining the contact points between the bumpers at equal distances from the axes of the respective gangs, and said means comprising a member connecting the inner ends of the gangs and means swingably supporting the member for forward and rearward movements to correspondingly adjust the inner ends of the disk gangs.

7. For a disk harrow having oppositely extending disk gangs and a forwardly extending draft device and said gangs having bumpers at their inner ends which roll in contact with each other at points eccentric to their centers, means for connecting the gangs to said draft device and comprising a member connected between the inner ends of the gangs and to the draft device and adjustably forwardly and rearwardly with respect to the draft device to correspondingly adjust the inner ends of the gangs and maintain the contact points between the respective bumpers at equal distances from their centers.

8. For a disk harrow having oppositely extending disk gangs and a forwardly extending draft device and said gangs having bumpers at their inner ends which roll in contact with each other at points eccentric to their centers, means for connecting the gangs to said draft device and comprising a member extending substantially crosswise of the draft device and connected at opposite ends to the inner ends of the gangs, and said member being adjustably mounted between its ends on the draft device so that its ends may be adjusted forwardly and rearwardly to thereby correspondingly adjust the inner ends of the gangs and maintain the contact points between the bumpers at equal distances from their centers.

9. In a disk harrow construction comprising oppositely extending disk gangs and a forwardly extending draft device and said gangs having bumpers at their inner ends which roll in contact with each other as the gangs operate, the improvement which comprises adjustable connections between the inner ends of the gangs and the draft device by which said inner ends may be adjusted forwardly and rearwardly with respect to each other to maintain the proper contact between the bumpers and overcome the tendency of one to climb on the other and cause uneven penetration of the inner parts of the gangs.

10. In a disk harrow construction comprising oppositely extending disk gangs and a forwardly extending draft device and said gangs having bumpers at their inner ends which roll in contact with each other as the gangs operate, the improvement which comprises adjustable connections between the inner ends of the gangs and the draft device by which said inner ends may be adjusted simultaneously and differentially in forward and rearward directions with respect to each other to thereby obtain proper rolling contact between the bumpers.

WILLIAM E. KNAPP.

REFERENCES CITED

The following references are of record in the file of this patent:

UNITED STATES PATENTS

| Number | Name | Date |
|---|---|---|
| 564,133 | Woodlan | July 14, 1896 |
| 589,797 | Sharp | Sept. 7, 1897 |
| 1,186,130 | Ray | June 6, 1916 |
| 1,517,659 | Warne | Dec. 2, 1924 |
| 2,266,819 | Seaholm | Dec. 23, 1941 |
| 2,320,015 | Seaholm | May 24, 1943 |